United States Patent Office 3,313,703
Patented Apr. 11, 1967

3,313,703
19-NOR-$\Delta^{4,9,11}$-PREGNATRIENE-3,20-DIONE,
PROCESS AND INTERMEDIATES
Robert Bucourt, Clichy-sous-Bois, André Pierdet Noisy-le-Sec, and Germain Costerousse, Montrouge, France, assignors to Roussel-Uclaf, Paris, France, a corporation of France
No Drawing. Filed Oct. 5, 1964, Ser. No. 401,657
Claims priority, application France, Oct. 8, 1963, 949,929
19 Claims. (Cl. 167—74)

The present invention relates to a novel unsaturated tetracyclic compound as well as to a process for the preparation of this compound and intermediates in its production. In particular, the invention relates to the novel trienic tetracyclic compound, 19-nor-$\Delta^{4,9,11}$-pregnatriene-3,20-dione, its process of production and intermediates in its production.

The compound of the invention, 19-nor-$\Delta^{4,9,11}$-pregnatriene-3,20-dione, possesses interesting physiological properties and it is endowed particularly with a remarkable progestomimetic action which is orally five times stronger than the corresponding activity of 19-nor progesterone. Subcutaneously, it possesses a real progestational action.

An object of the present invention is the obtention of 19-nor-$\Delta^{4,9,11}$-pregnatriene-3,20-dione of the formula

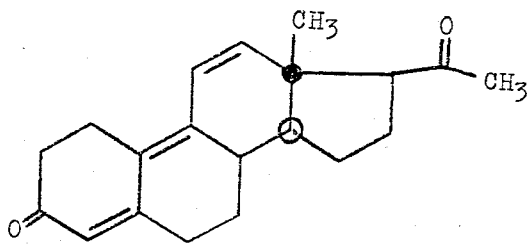

Another object of the present invention is the development of a process for the production of 19-nor-$\Delta^{4,9,11}$-pregnatriene-3,20-dione of the formula

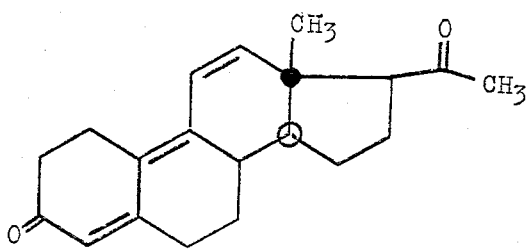

which comprises the steps of (a) condensing an alkali metal cyanide with 5-methoxy-des-A-$\Delta^{5,7,9}$-estratriene-17-one, (b) reacting the resultant 5-methoxy-17α-cyano-des-A-$\Delta^{5,7,9}$-estratriene-17β-ol with a dehydrating agent, (c) reacting the resultant 5-methoxy-17-cyano-des-A-$\Delta^{5,7,9,16}$-estratetraene with a methylmagnesium halide in an organic solvent, (d) hydrolyzing the product by the action of an acidic hydrolyzing agent, (e) reducing the resultant 5-methoxy-19-nor-des-A-$\Delta^{5,7,9,16}$-pregnatetraene-20-one by the action of hydrogen in the presence of a catalyst, (f) reducing the resultant 5-methoxy-19-nor-des-A-$\Delta^{5,7,9}$-pregnatriene-20-one by the action of an alkali metal borohydride in a solvent, (g) reducing the resultant 5-methoxy-9-nor-des-A-$\Delta^{5,7,9}$-pregnatriene-20ξ-ol by the Birch process, (h) hydrolyzing the product by the action of an acidic hydrolyzing agent, (i) esterifying the resultant 19-nor-des-A-$\Delta^9$-pregnene-20ξ-ol-5-one by the action of an esterifying derivative of a hydrocarbon carboxylic acid having from 1 to 8 carbon atoms, (j) reacting the resultant ester of the formula

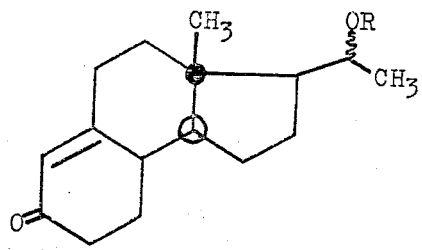

wherein R represents the acyl radical of a hydrocarbon carboxylic acid having from 1 to 8 carbon atoms, with a secondary amine of the formula

wherein R' and R'' are selected from the group consisting of lower alkyl and when taken together represent a bridging radical selected from the group consisting of alkylene having from 4 to 6 carbon atoms and morpholino, (k) condensing the resultant 5-enamino compound of the formula

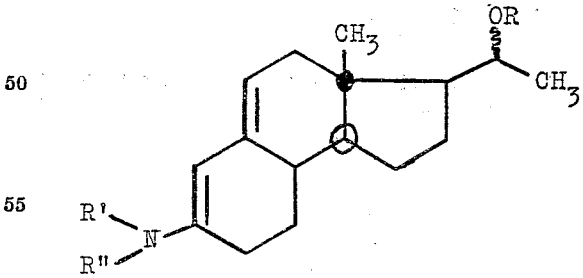

wherein R, R' and R'' have the above assigned values with a 1-halo-3-chloro-2-butene in the presence of an organic solvent, (1) enolyzing the resultant 4,5 seco compound of the formula

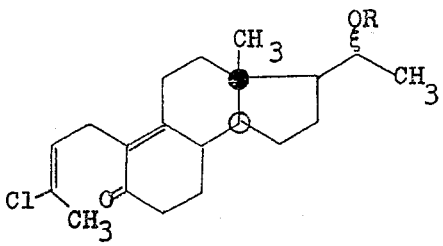

wherein R has the above-assigned value by the action of an esterifying derivative of a hydrocarbon carboxylic acid having from 1 to 8 carbon atoms in the presence of an organic solvent, (m) subjecting the resultant 5-acyloxy compound of the formula

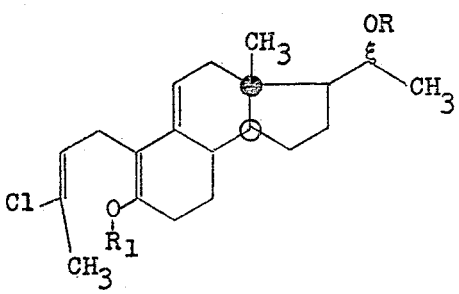

wherein R has the above-assigned value and $R_1$ represents the acyl radical of a hydrocarbon carboxylic acid having from 1 to 8 carbon atoms to the action of bromide followed by dehydrobromination and weak acid hydrolsis, (n) hydrolyzing the resultant 5-one of the formula

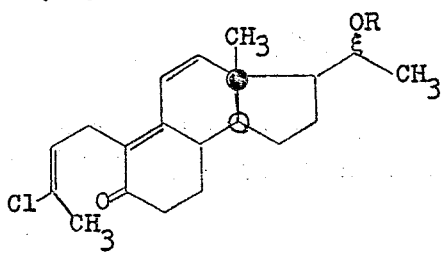

wherein R has the above-assigned value by the action of a strongly acidic hydrolyzing agent, (o) cyclizing the resultant dione of the formula

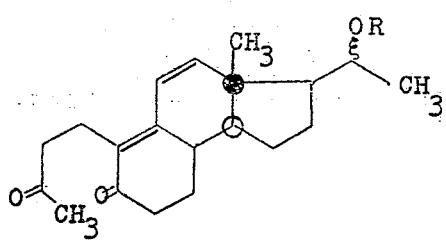

wherein R has the above-assigned value by the action of an alkaline cyclizing agent, (p) saponifying the resultant triene compound of the formula

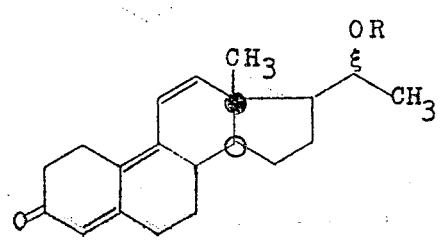

wherein R has the above-assigned value by the action of an alkaline saponification agent, (q) oxidizing the resultant 19 - nor-$\Delta^{4,9,11}$-pregnatriene-20ξ-ol-3-one by the action of a sulfochromic acid oxidant and (r) recovering said 19-nor-$\Delta^{4,9,11}$-pregnatriene-3,20-dione.

A further object of the present invention is the obtention of the novel intermediate compounds:

(a) 5-methoxy-17α-cyano-des-A-$\Delta^{5,7,9}$-estratriene-17β-ol
(b) 5-methoxy-17-cyano-des-A-$\Delta^{5,7,9,16}$-estratetraene
(c) 5-methoxy-19-nor-des-A-$\Delta^{5,7,9,16}$-pregnatetraene-20-one
(d) 5-methoxq19-nor-des-A-$\Delta^{5,7,9}$-pregnatriene-20-one
(e) 5-methoxy-19-nor-des-A-$\Delta^{5,7,9}$-pregnatriene-20ξ-ol
(f) 19-nor-des-A-$\Delta^9$-pregnene-20ξ-ol-5-one
(g) 20ξ - acyloxy-19-nor-des-A-$\Delta^9$-pregnene-5-one wherein acyl represents the acyl radical of a hydrocarbon carboxylic acid having from 1 to 8 carbon atoms, and particularly the acetate.
(h) The 5-enamino compound of the formula

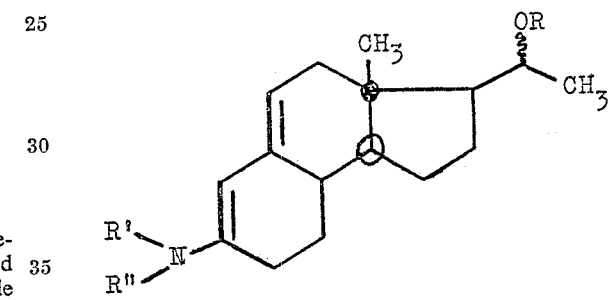

wherein R represents the acyl radical of a hydrocarbon carboxylic acid having from 1 to 8 carbon atoms, and R' and R" are selected from the group consisting of lower alkyl and when taken together represent a bridging radical selected from the group consisting of alkylene having from 4 to 6 carbon atoms and morpholino and particularly the 5-pyrrolidyl-20ξ-acetoxy derivative.

(i) 3 - chloro - 20ξ-acyloxy-4,5-seco-19-nor-$\Delta^{2,9}$-pregnadiene-5-one wherein acyl represents the acyl radical of a hydrocarbon carboxylic acid having from 1 to 8 carbon atoms, and particularly the acetate.
(j) 3 - chloro - 5,20ξ - diacyloxy - 4,5 - seco - 19-nor-$\Delta^{2,5(10),9(11)}$-pregnatriene wherein acyl represents the acyl radical of a hydrocarbon carboxylic acid having from 1 to 8 carbon atoms, and particularly the diacetate.
(k) 3 - chloro - 20ξ - acyloxy - 4,5 - seco - 19-nor-$\Delta^{2,9,11}$-pregnatriene-5-one wherein acyl represents the acyl radical of a hydrocarbon carboxylic acid having from 1 to 8 carbon atoms, and particularly the acetate.
(l) 20ξ - acyloxy -4,5 - seco - 19- nor - $\Delta^{9,11}$ - pregnadiene-3,5-dione wherein acyl represents the acyl radical of a hydrocarbon carboxylic acid having from 1 to 8 carbon atoms, and particularly the acetate.
(m) 20ξ - acyloxy - 19 - nor - $\Delta^{4,9,11}$ - pregnatriene-3-one wherein acyl represents the acyl radical of a hydrocarbon carboxylic acid having from 1 to 8 carbon atoms, and particularly the acetate.
(n) 19-nor-$\Delta^{4,9,11}$-pregnatriene-20ξ-ol-3-one.

These and other objects of the invention will become more apparent as the description thereof proceeds.

The process for the preparation of 19-nor-$\Delta^{4,9,11}$-pregnatriene-3,20-dione is summarized by the flow diagram of Table I.

TABLE I
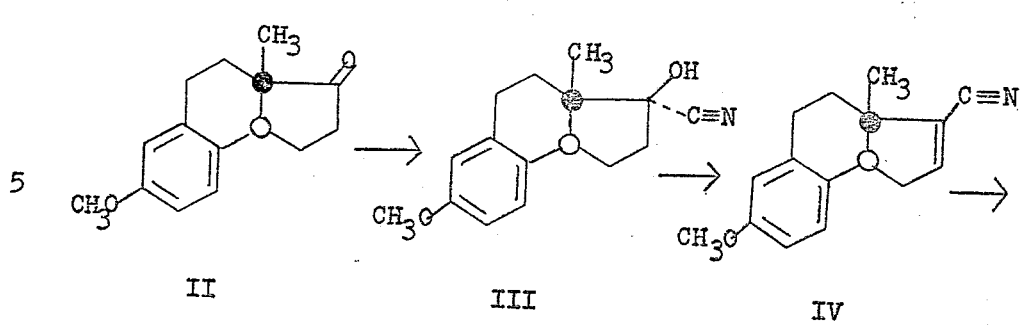
II    III    IV
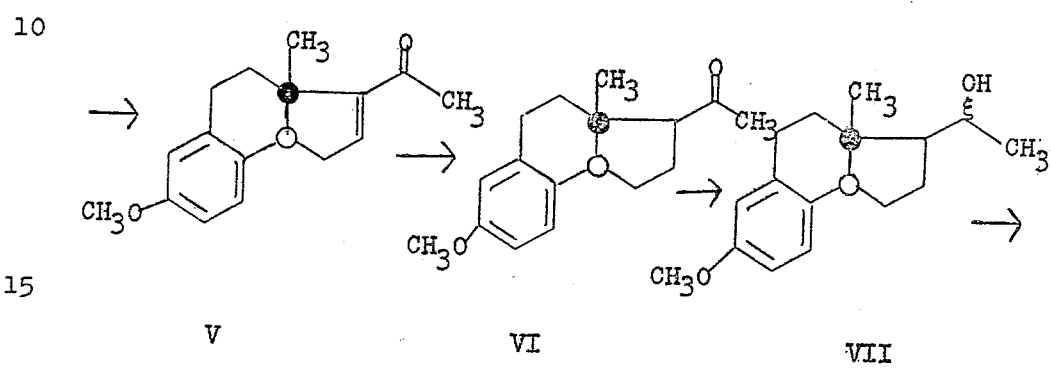
V    VI    VII
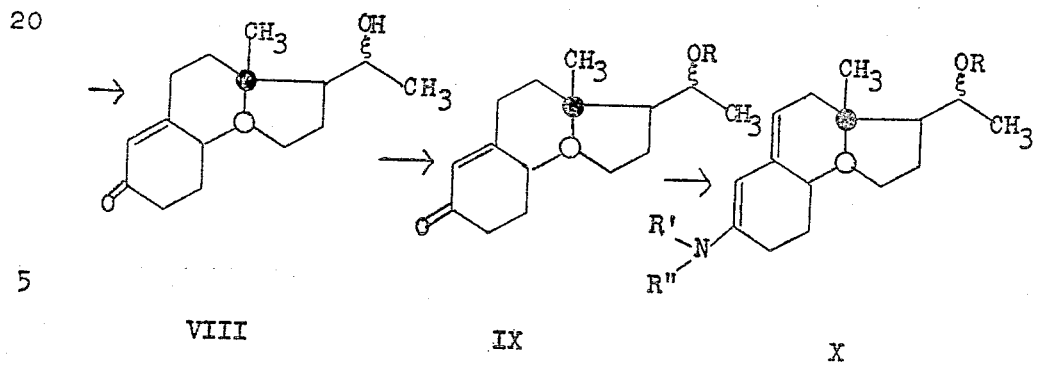
VIII    IX    X

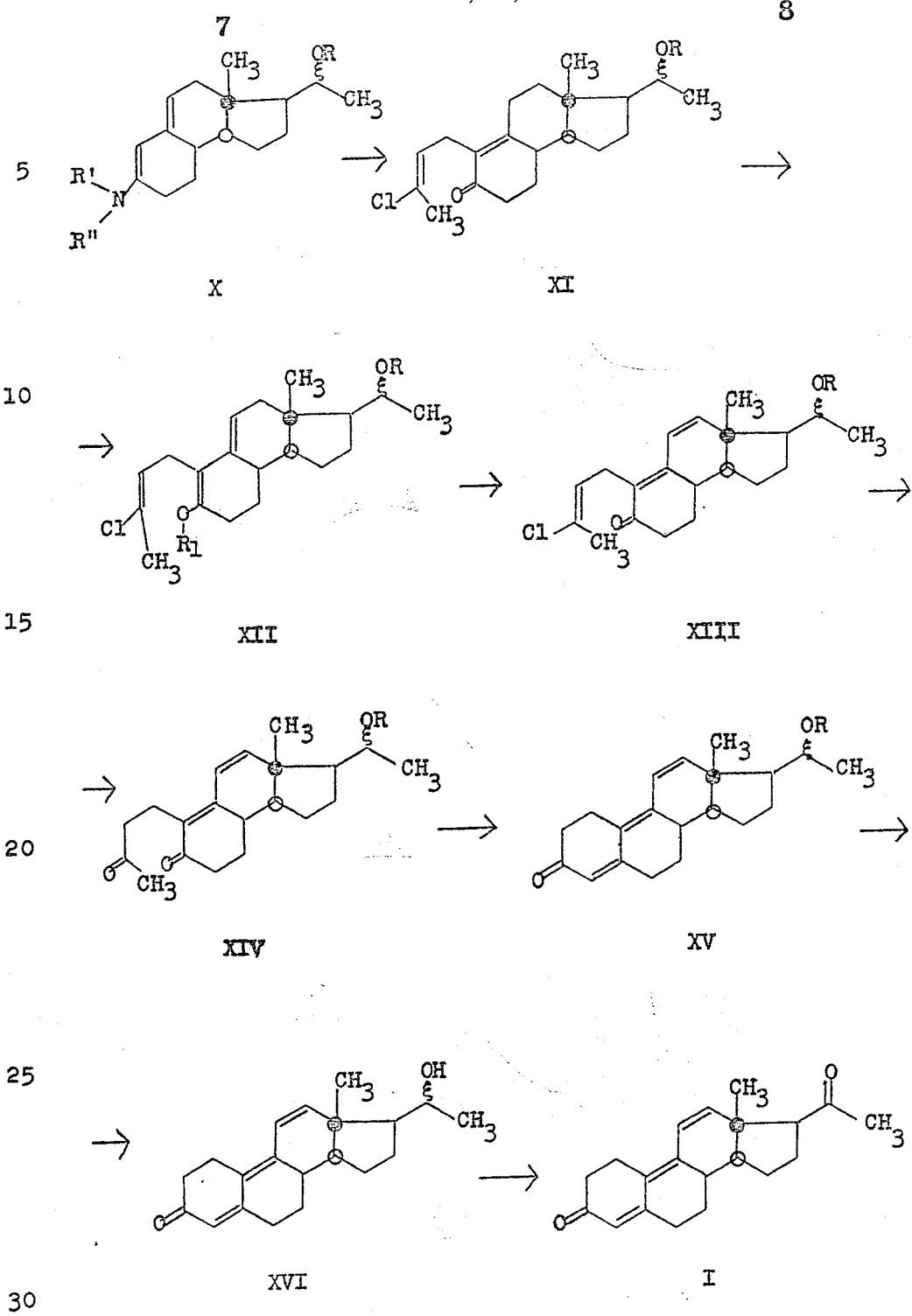

In this table as well as in the following text, R, R', R" and $R_1$ have the following values:

R and $R_1$ represent the acyl radical of a hydrocarbon carboxylic acid having from 1 to 8 carbon atoms; R' and R" are selected from the group consisting of alkyl, which may be identical or different, having from 1 to 6 carbon atoms, and when taken together represent a bridging radical selected from the group consisting of alkylene having from 4 to 6 carbon atoms and morpholino.

The process of the invention is characterized essentially in that an alkali metal cyanide is condensed with 5-methoxy-des-A-$\Delta^{5,7,9}$-estratriene-17-one, II, the resulting cyanohydrin, III, is subjected to the action of a dehydrating agent, the resulting 5-methoxy-17-cyano-des-A-$\Delta^{5,7,9,16}$-estratetraene, IV, is obtained which, by the action of a methylmagnesium, halide followed by acid hydrolysis, gives 5-methoxy-19-nor-des-A-$\Delta^{5,7,9,16}$-pregnatetraene - 20 - one, V, which compound is catalytically reduced to 5-methoxy-19-nor-des-A-$\Delta^{5,7,9}$-pregnatriene-20-one, VI, which, when reduced by an alkali metal borohydride, yields the corresponding 20-hydroxyl derivative, VII, which is subjected to a reduction according to the Birch process, an acid hydrolysis of the reduced product is effected and 19-nor-des-A-$\Delta^9$-pregnen-20ξ-ol-5-one, VIII, is obtained, of which the hydroxyl in 20 position is protected in form of a lower organic acid ester, IX, an enamine in 5 position is formed by action of a secondary amine, and 5-enamino-20ξ-acyloxy-19-nor-des-A-$\Delta^{5(10),9(11)}$-pregnadiene, X, is obtained. This latter compound is condensed with 1-halo-3-chloro-2-butene, the resultant 3-chloro-4,5-seco-19-nor-$\Delta^{2,9}$-pregnadiene-5-one, XI, is transformed into the enol lower acylate, the so-formed 3-chloro-5,20ξ-diacyloxy-4,5-seco-19-nor-$\Delta^{2,5(10),9(11)}$-pregnatriene, XII, is subjected to a bromination in the 11 position followed by a dehydrobromination, 3-chloro-4,5-seco-19-nor-$\Delta^{2,9,11}$-pregnatriene-5-one, XIII, is obtained of which the ketone function in 3-position is liberated by strong acid hydrolysis, the resultant 20ξ-acyloxy-4,5-seco-19-nor-$\Delta^{9,11}$-pregnadiene-3,5-dione, XIV, is subjected to the action of an alkaline cyclization agent, 20ξ-acyloxy-19-nor-$\Delta^{4,9,11}$-pregnatriene-3-one, XV, is obtained. The ester in 20 position of this latter compound is saponified and the resulting 19-nor-$\Delta^{4,9,11}$-pregnatriene-20ξ-ol-3-one, XVI, is subjected to the action of an oxidizing agent to give the desired 19-nor-$\Delta^{4,9,11}$-pregnatriene-3,20-dione, I.

The performance of this process of the invention may be characterized advantageously by the following points:

(a) the alkali metal cyanide is preferably potassium cyanide and the condensation with 5-methoxy-des-A-$\Delta^{5,7,9}$-estradiene-17-one, II, is conducted by operating in the cold at temperatures of from about 0° C. to room temperature in the presence of a lower alkanoic acid such as acetic acid and an organic solvent such as methanol.

(b) The dehydration of 5-methoxy-17α-cyano-des-A-$\Delta^{5,7,9}$-estratriene-17β-ol, III, is effected with the aid of phosphorus oxychloride, in the presence of pyridine, at reflux temperatures.

(c) The methylmagnesium halide, which is reacted with 5-methoxy-17-cyano-des-A-$\Delta^{5,7,9,16}$ - estratetraene, IV, is preferably methylmagnesium bromide and the reaction is performed in an organic solvent such as ether.

(d) The 16 double bond of the 5-methoxy-19-nor-des-A-$\Delta^{5,7,9,16}$-pregnatetraene-20-one, V, is reduced by catalytic hydrogenation utilizing hydrogen in the presence of a catalyst containing paladium in the presence of an organic solvent.

(e) The 20-keto group of the 5-methoxy-19-nor-des-A-$\Delta^{5,7,9}$-pregnatriene-20-one, VI, is reduced with the aid of an alkali metal borohydride such as potassium borohydride in an organic solvent.

(f) The Birch reduction of 5-methoxy-19-nor-des-A-$\Delta^{5,7,9}$-pregnatriene-20ξ-ol, VII, is effected by the action of an alkali metal such as lithium in liquid ammonia, while operating in the presence of an anhydrous organic solvent such as ether, and this reduction is followed by an acid hydrolysis by a strong mineral acid, especially by hydrochloric acid.

(g) The hydroxyl in the 20 position which is of uncertain configuration and is designated by the symbol ξ of the 19-nor-des-A-$\Delta^9$-pregnene-20ξ-ol-5-one, VIII, is protected in form of an organic acid ester, preferably of a hydrocarbon carboxylic acid having from 1 to 8 carbon atoms such as a lower alkanoic acid, particularly acetic acid, compound IX. The esterification is conducted with an esterifying derivative of said acids such as the acid anhydride or the acid chloride in the presence of a solvent such as pyridine.

(h) The enamine in 5 position of the 20ξ-acyloxy-19-nor-des-A-$\Delta^9$-pregnene-5-one, IX, is prepared by action of a secondary amine of the formula

wherein R′ and R″ are selected from the group consisting of lower alkyl and when taken together represent a bridging radical selected from the group consisting of alkylene having from 4 to 6 carbon atoms and morpholino at reflux and 5-enamino-20ξ-acyloxy-19 - nor - des-A-$\Delta^{5(10),9(11)}$-pregnadiene, X, is obtained.

(i) The 1-halo-3-chloro-2-butene is preferably 1,3-dichloro-2-butene and the condensation with the 5-enamino-20ξ-acyloxy - 19 - nor-des-A-$\Delta^{5(10),9(11)}$-pregnadiene, X, is effected in the presence of potassium iodide, working in the presence of an organic solvent such as dimethylformamide, in darkness at about 0° C.

(j) The enol acylate of 3-chloro-4,5-seco-20ξ-acyloxy-19-nor-$\Delta^{2,9}$-pregnadiene-5-one, XI, is prepared from one of the acid derivatives listed above in Step g, preferably acetic acid anhydride and it is obtained in the presence of an acidic esterification catalyst such as p-toluene sulfonic acid in an organic solvent such as toluene.

(k) The bromination of 3-chloro-5,20ξ-diacyloxy-4,5-seco-19-nor-$\Delta^{2,5(10),9(11)}$-pregnatriene, XII, is obtained by action of the bromine in the presence of an organic solvent such as dimethylformamide and the dehydrobromination is effected preferentially by the action of mixed lithium bromide-lithium carbonate in dimethylformamide. The product is then subjected to a weak acid hydrolysis preferably with an alkanoic acid such as acetic acid.

(l) The hydrolysis of 3-chloro-20ξ-acyloxy-4,5-seco-19-nor-$\Delta^{2,9,11}$-pregnatriene-5-one, XIII, is effected with the aid of a strong mineral acid and especially by sulfuric acid, working in the presence of an organic solvent such as methylene chloride.

(m) The cyclization of 20ξ-acyloxy-4,5-seco-19-nor-$\Delta^{9,11}$-pregnadiene-3,5-dione, XIV, is obtained by the action of an alkaline cyclization agent such as an alkali metal alkanolate, preferably a tertiary lower alkanolate of an alkali metal and especially sodium t-amylate in the presence of an anhydrous organic solvent at temperatures of from about 0° C. to about room temperature.

(n) The alkaline saponification of 20ξ-acyloxy-19-nor-$\Delta^{4,9,11}$-pregnatriene-3-one, XV, is effected by an alkali metal hydroxide in a lower alkanol, such as potassium hydroxide in methanol.

(o) The oxidizing agent, to which 19-nor-$\Delta^{4,9,11}$-pregnatriene-20ξ-ol-3-one, XVI, is subjected, is the mixture of chromic and sulfuric acids.

The starting product of the described process, 5-methoxy-des-A-$\Delta^{5,7,9}$-estratriene-17-one, II, may be obtained according to the process described in the publication Bull. Soc. Chim. France, pages 1923–1925 (1963).

The following example is illustrative of the invention. It is to be understood however that the example is not to be construed as limitative.

EXAMPLE—PREPARATION OF 19-NOR-$\Delta^{4,9,11}$-PREGNATRIENE-3,20-DIONE, I

*Step A: 5-methoxy-17α-cyano-des-A-$\Delta^{5,7,9}$-estratriene-17β-ol, III*

15 g. of 5-methoxy-des-A-$\Delta^{5,7,9}$-estratriene-17-one, II, were dissolved in 400 cc. of methanol and 100 cc. of acetic acid. Then, over a period of 25 minutes, 57 g. of finely powdered potassium cyanide were introduced, at a temperature of 10° C. The mixture was agitated for a period of 18 hours at room temperature, then poured into water and agitated. The precipitate was vacuum filtered, washed with water and dried. 15.27 g. (being a yield of 91%) of 5-methoxy-17α-cyano-des-A-$\Delta^{5,7,9}$-estratriene-17β-ol, III, were obtained, which compound was used as such in the next step.

When purified, the product presented the following constants: melting point, 149° C., specific rotation $[\alpha]_D^{20} = -57.4°$ (c.=0.5%, in chloroform).

The product was colorless, insoluble in water and slightly soluble in isopropyl ether.

This compound is not described in the literature.

*Step B: 5-methoxy-17-cyano-des-A-$\Delta^{5,7,9,16}$-estratetraene, IV*

20.5 g. of 5-methoxy-17α-cyano-des-A-$\Delta^{5,7,9}$-estratriene-17β-ol, III, were dissolved in 70 cc. of anhydrous pyridine, then 20 cc. of phosphorus oxychloride were slowly introduced and the mixture was heated to reflux for a period of 6 hours and a half. The mixture was then cooled to room temperature and poured into ice water. Methylene chloride was added thereto and the mixture was acidified with sulfuric acid. The aqueous phase was decanted.

The organic phase was washed with water until the wash waters were neutral, and then dried. The solution obtained was passed through a magnesium silicate column and then evaporated to dryness under vacuum. 16 g. of product were thus obtained.

The obtained product was recrystallized from isopropyl ether and yielded 12.1 g. of 5-methoxy-17-cyano-des-A-$\Delta^{5,7,9,16}$-estratetraene, IV. The product had a melting point of 103.5° C. and a specific rotation $[\alpha]_D^{20}=+116.2°$ (c.=0.5% in methanol).

The product was insoluble in water, dilute aqueous acids and alkalis, and isopropyl ether, and soluble in methylene chloride.

This compound is not described in the literature.

Step C: *5-methoxy-19-nor-des-A-$\Delta^{5,7,9,16}$-pregnatetraene-20-one, V*

A solution of 1.9 g. of 5-methoxy-17-cyano-des-A-$\Delta^{5,7,9,16}$-estratetraene, IV, in 20 cc. of anhydrous ether was added to 30 cc. of an ethereal solution of 2.6 N methylmagnesium bromide under a nitrogen atmosphere. The mixture was heated to reflux for a period of 90 hours, then cooled to 10° C. and very slowly poured into ice water.

Over a period of 10 minutes, 20 cc. of acetic acid were introduced and the mixture was gently heated for a period of 3 hours without exceeding a temperature of 80–85° C.

After the mixture was cooled, it was poured into a saturated sodium bicarbonate solution and allowed to stand in an ice bath for 1 hour. The precipitate was then vacuum filtered, washed with water and dried. 1.895 g. of product were obtained.

The product was crystallized from isopropyl ether and yielded 1.465 g. of 5-methoxy-19-nor-des-A-$\Delta^{5,7,9,16}$-pregnatetraene-20-one, V, having a melting point of 106° C., and a specific rotation $[\alpha]_D^{20}=+177.4°$ (c.=0.5% in methanol).

Starting from the mother liquor, a further yield of 0.130 g. of the same compound was obtained.

The product was yellow, insoluble in water, dilute aqueous acids and alkalis, slightly soluble in isopropyl ether and soluble in methylene chloride.

This compound is not described in the literature.

Step D: *5-methoxy-19-nor-des-A-$\Delta^{5,7,9}$-pregnatriene-20-one, VI*

2 g. of 5-methoxy-19-nor-des-A-$\Delta^{5,7,9,16}$-pregnatetraene-20-one, V, were introduced into 30 cc. of anhydrous ethyl acetate under a nitrogen atmosphere. 1 g. of carbon black containing 15% palladium was added to the mixture, then a hydrogen stream was allowed to pass therethrough for ½ hour.

The mixture was vacuum filtered and evaporated to dryness under vacuum. 1.96 g. of product was obtained.

The product obtained was dissolved in hot hexane, iced to −20° C. and the crystallization was incited by scratching. The crystals were vacuum filtered and dried. 1.515 g. of 5-methoxy-19-nor-des-A-$\Delta^{5,7,9}$-pregnatriene-20-one, VI, were obtained, having a melting point of 50° C., and a specific rotation $[\alpha]_D^{20}=+91°$ (c.=0.5% in methanol).

The product was white, insoluble in water, dilute aqueous acids and alkalis, slightly soluble in hexane, and soluble in alcohols, ether, acetone, benzene and chloroform.

*Analysis.*—$C_{17}H_{22}O_2$, molecular weight=258.35. Calculated: C, 79.04%; H, 8.58%. Found: C, 7.91%; H, 8.4%.

This compound is not described in the literature.

Step E: *5-methoxy-19-nor-des-A-$\Delta^{5,7,9}$-pregnatriene-20$\xi$-ol, VII*

11.95 g. of 5-methoxy-19-nor-des-A-$\Delta^{5,7,9}$-pregnatriene-20-one, VI, were dissolved in 600 cc. of ethanol and a solution of 11.95 g. of potassium borohydride in 240 cc. of water were added. The reactional mixture was then agitated for a period of 2½ hours at room temperature. The mixture was poured into ice water and was left standing in the refrigerator overnight.

Next, the precipitate was vacuum filtered, washed with water and dried, 11.5 g. of product were obtained, which product was recrystallized in isopropyl ether.

8.74 g. of 5-methoxy-19-nor-des-A-$\Delta^{5,7,9}$-pregnatriene-20$\xi$-ol, VII, were obtained having a melting point of 124° C. and a specific rotation $[\alpha]_D^{20}=0°$ (c.=0.5% in methanol).

The product occurred in form of white prisms, insoluble in water, dilute aqueous acids and alkalis, and soluble in alcohols, ether, acetone, benzene and chloroform.

*Analysis.*—$C_{17}H_{24}O_2$, molecular weight=260.36. Calculated: C, 78.41%; H, 9.29%. Found: C, 78.1%; H, 9.4%.

This compound is not described in the literature.

Step F: *19-nor-des-A-$\Delta^9$-pregnene-20$\xi$-ol-5-one, VIII*

2.43 liters of gaseous anhydrous ammonia were condensed at a temperature of −75° C. 5.74 g. of lithium, freshly divided into small pieces, were introduced therein under a nitrogen atmosphere over a period of 50 minutes. The mixture was then agitated for a period of 15 minutes, next, 435 cc. of anhydrous ethyl ether were introduced over a period of 45 minutes.

A solution of 8.74 g. of 5-methoxy-19-nor-des-A-$\Delta^{5,7,9}$-pregnatriene-20$\xi$-ol, VII, in 435 cc. of anhydrous ether was added very slowly to the above mixture. The reaction mixture was agitated for a period of 4 hours, during the course of which, about 400 cc. of ether were re-added to the mixture. Then, 1 liter of ethanol was introduced over a period of about one hour.

The ammonia was evaporated therefrom. Next, 900 cc. of fuming hydrochloric acid were added. The ether was evaporated and the mixture was heated to 65–70° C. for a period of 15 minutes. Thereafter the mixture was cooled to room temperature, poured into water and extracted with methylene chloride. The extracts were washed with water, dried, filtered and evaporated to dryness. 8.431 g. of residue were obtained, which was crystallized from hexane.

6.972 g. of 19-nor-des-A-$\Delta^9$-pregnene-20$\xi$-ol-5-one, VIII, were obtained having a melting point of 104° C., and a specific rotation $[\alpha]_D^{20}=-30.6°$ (c.=0.5% in methanol).

The product occurred in form of colorless prisms, insoluble in water, dilute aqueous acids and alkalis, and soluble in alcohols, ether, acetone and chloroform.

*Analysis.*—$C_{16}H_{24}O_2$, molecular weight=248.35. Calculated: C, 77.87%; H, 9.74%. Found: C, 77.3%; H, 9.7%.

This compound, which is one of the isomers in 20 position, whose racemic mixture is known according to the Bull. Soc. Chim., page 1924 (1963), is not described in the literature.

Step G: *20$\xi$-acetoxy-19-nor-des-A-$\Delta^9$-pregnene-5-one, IX, (R=COCH$_3$)*

1 g. of 19-nor-des-A-$\Delta^9$-pregnene-20$\xi$-ol-5-one, VIII, was dissolved in 4 cc. of pyridine. 2 cc. of acetic acid anhydride were added and the mixture was heated to 60° C. while agitating under a nitrogen atmosphere for a period of one hour.

The mixture was cooled and poured into ice water. The aqueous mixture was extracted with methylene chloride and the extracts were washed successively with normal hydrochloric acid, with a saturated aqueous solution of sodium bicarbonate, and finally with water.

After drying, 1.173 g. of 20$\xi$-acetoxy-19-nor-des-A-$\Delta^9$-pregnene-5-one, IX, (R=COCH$_3$), were obtained, which was utilized as such for the following step of the synthesis.

This compound is not described in the literature.

Step H: 5-pyrrolidyl-20ξ-acetoxy-19-nor-des-A-Δ5(10),9(11)-pregnadiene, X (with R=COCH₃ and R' and R" together with the nitrogen atom forming the pyrrolidyl)

2.338 g. of 20ξ-acetoxy-19-nor-des-A-Δ⁹-pregnene-5-one, IX, (R=COCH₃) were dissolved in 11.5 cc. of anhydrous pyrrolidine and the solution was heated to reflux under a nitrogen atmosphere for a period of an hour while distilling part of the pyrrolidine.

After cooling to 0° C., anhydrous methanol was added to the mixture and it was iced. The precipitate was vacuum filtered and dried in darkness. 2.074 g. of 5-pyrrolidyl-20ξ-acetoxy-19-nor-des-A-Δ5(10),9(11)-pregnadiene,

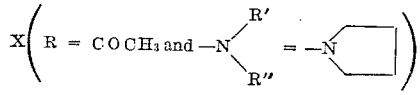

were obtained having a melting point of 138° C.

The product occurred in form of prisms, insoluble in water, slightly soluble in alcohols, and soluble in acetone, benzene and chloroform.

This compound is not described in the literature.

Step I: 3-chloro-20ξ-acetoxy-4,5-seco-19-nor-Δ²,⁹-pregnadiene-5-one, XI, (with R=COCH₃)

In darkness, 2.072 g. of 5-pyrrolidyl-20ξ-acetoxy-19-nor-des-A-Δ5(10),9(11)-pregnadiene,

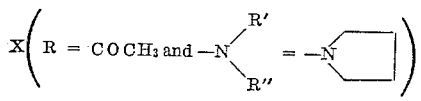

were introduced into 8.4 cc. of a solution of potassium iodide in dimethylformamide assaying 11.95 g. percent cc. and cooled to about 0° C.

The mixture was agitated for 15 minutes, then 0.786 cc. of anhydrous 1,3-dichloro-2-butene were added thereto, all while in darkness, and the mixture was agitated for a period of 2½ hours under a nitrogen atmosphere.

1.6 cc. of distilled water were then added, the mixture was heated to about 90° C. for ½ hour, and this temperature was maintained for a period of 2 hours while agitating under a nitrogen atmosphere.

The mixture was then cooled to room temperature and extracted with methylene chloride. The extracts were washed in water, dried, filtered and evaporated to dryness. The residue obtained was subject to chromatography through silica gel and eluted with methylene chloride containing 2.5% and 5% acetone. 2.167 g. of 3-chloro-20ξ-acetoxy-4,5-seco-19-nor-Δ²,⁹-pregnadiene-5-one, XI, (R=COCH₃) were obtained, which product was used as such for the following step of the synthesis.

*Analysis.*—Cl percent=9.6 (theory: 9.36).

This compound is not described in the literature.

Step J: 3 - chloro - 5,20ξ - diacetoxy - 4,5 - seco-19-nor-Δ2,5(10),9(11)-pregnatriene, XII, (with R=COCH₃ and R₁=COCH₃)

971 mg. of 3-chloro-20ξ-acetoxy-4,5-seco-19-nor-Δ²,⁹-pregnadiene-5-one, XI, (R=COCH₃), were introduced into 25 cc. of anhydrous toluene. 3.9 cc. of acetic acid anhydride and 39 mg. of p-toluene-sulfonic acid were added. The mixture was then heated to reflux over a period of 5½ hours under a nitrogen atmosphere. The mixture was cooled to room temperature and slowly a saturated aqueous solution of sodium bicarbonate was added.

The mixture was agitated for 1 hour at room temperature and decanted. The toluenic phase was washed with water until the wash waters were neutral. The solution was dried and filtered. The filtrate was treated with animal black, filtered, evaporated to dryness under vacuum. 1.08 g. of 3-chloro-5,20ξ-diacetoxy-4,5-seco-19-nor-Δ2,5(10),9(11)-pregnatriene, XII, (R and R₁=COCH₃) were obtained, which product was used as such for the following step of the synthesis.

This compound is not described in the literature.

Step K: 3-chloro-20ξ-acetoxy-4,5-seco-19-nor-Δ²,⁹,¹¹-pregnatriene-5-one, XIII, (with R=COCH₃)

*Bromination.*—2.33 g. of 3-chloro-5,20ξ-diacetoxy-4,5-seco - 19 - nor - Δ2,5(10),9(11) - pregnatriene, XII, (R and R₁=COCH₃) were dissolved in 23 cc. of anhydrous dimethylformamide. 1.795 g. of fused anhydrous sodium acetate were added thereto, under agitation under a nitrogen atmosphere. Then, within a 4 hour period, 12.9 cc. of a solution of bromine in dimethylformamide assaying 9.6 g. per 100 cc., were added. The reaction mixture was agitated for 1 hour, then poured into ice water.

The aqueous mixture was extracted with methylene chloride. The methylene chloride extracts were washed until neutral first with a saturated aqueous solution of sodium bicarbonate, then with water.

The extract was dried and evaporated to dryness under vacuum. A brominated product was obtained, which was used as such for the continuation of the synthesis.

*Dehydrobromination.*—2.33 g. of fused anhydrous lithium bromide, 2.33 g. of anhydrous lithium carbonate and the brominated product obtained above in 39 cc. of anhydrous dimethylformamide were heated to 110° C. over a period of 18 hours under a nitrogen atmosphere.

The mixture was cooled and poured into a mixture of 75 cc. of ice water, 38 cc. of methylene chloride and 4 cc. of acetic acid, agitated for 5 minutes, then brought to a pH of 7 by addition of 2 cc. of acetic acid.

The methylene chloride was decanted and the aqueous phase was extracted with methylene chloride. The extracts were combined with the decanted phase, washed with water until neutral, dried, filtered, and evaporated to dryness under vacuum. A resin was obtained which was subjected to chromatography through magnesium silicate.

The column was eluted with methylene chloride containing 0.5% of acetone, and 1.234 g. of 3-chloro-20ξ-acetoxy-4,5-seco-19-nor-Δ²,⁹,¹¹-pregnatriene-5 - one, XIII, (R=COCH₃) was obtained. This product was used as such for the next step of the synthesis.

This compound is not described in the literature.

Step L: 20ξ-acetoxy-4,5-seco-19-nor-Δ⁹,¹¹-pregnadiene-3,5-dione, XIV, (R=COCH₃)

A solution of 1.214 g. of 3-chloro-20ξ-acetoxy-4,5-seco - 19 - nor - Δ²,⁹,¹¹ - pregnatriene - 5 - one, XIII, (R=COCH₃) in 1.2 cc. of methylene chloride was added to 6 cc. of pure 66° Bé. sulfuric acid introduced under a nitrogen atmosphere and cooled to 0° C.

The solution was agitated for a period of 20 minutes, next it was precipitated by adding it to the following mixture:

| | Cc. |
|---|---|
| Saturated aqueous solution of sodium bicarbonate | 50 |
| Methylene chloride | 55 |
| Ice water | 30 |

The solution was neutralized by addition of sodium bicarbonate and the methylene chloride was decanted. The organic phase was washed until it was neutral with a saturated aqueous solution of sodium chloride, then dried, filtered and distilled to dryness under vacuum. A product was obtained which was subject to chromatography through magnesium silicate.

The column was eluted with methylene chloride containing 2.5% of acetone and 565 mg. of 20ξ-acetoxy-4,5-seco - 19 - nor - Δ⁹,¹¹ - pregnadiene - 3,5 - dione, XIV, (R=COCH₃), were obtained. The product as such was used for the next step of the synthesis.

This compound is not described in the literature.

Step M: 20ξ-acetoxy-19-nor-Δ$^{4,9,11}$-pregnatriene-3-one, XV, (R=COCH$_3$)

*Preparation of the sodium t.-amylate.*—2.8 g. of sodium were introduced into 40 cc. of anhydrous toluene, heated to reflux. Then 12.5 cc. of anhydrous t.-amyl alcohol were added all at once, and the reflux was maintained for a period of 17 hours and 30 minutes while agitating under a nitrogen atmosphere.

After cooling, a solution of 2.1 N sodium t.-amylate was obtained.

*Cyclization.*—525 mg. of 20ξ-acetoxy-4,5-seco-19-nor-Δ$^{9,11}$-pregnadiene-3,5-dione, XIV, (R=COCH$_3$), were introduced into 5.3 cc. of anhydrous toluene. 0.36 cc. of a solution of 2.1 N sodium t.-amylate and 7 cc. of anhydrous toluene were added, while agitating under a nitrogen atmosphere, at a temperature of about 5° C.

The reaction mixture was agitated for a period of 6 hours at a temperature of +5° C. and the following mixture was then introduced:

|  | Cc. |
|---|---|
| Acetic acid | 0.05 |
| Toluene | 6.5 |

The mixture was extracted with methylene chloride and the extracts were washed with water until they were neutral.

After drying, filtering and evaporating to dryness under vacuum, a product was obtained which was subjected to chromatography through magnesium silicate.

The column was eluted with methylene chloride containing 1.5% acetone. 369 mg. of 20ξ-acetoxy-19-nor-Δ$^{4,9,11}$-pregnatriene-3-one, XV, (R=COCH$_3$) were obtained. The product was used as such for the next step of the synthesis.

The compound is not described in the literature.

Step N: 19-nor-Δ$^{4,9,11}$-pregnatriene-20ξ-ol-3-one, XVI 9.5 mg. of hydroquinone and 954 mg. of 20ξ-acetoxy-19-norΔ$^{4,9,11}$-pregnatriene-3-one, XV, (R=COCH$_3$) were dissolved in 5 cc. of anhydrous methanol.

While agitating the solution under a nitrogen atmosphere, 0.5 cc. of methanolic potassium hyroxide containing 11 g. per 100 cc. were added and the mixture was heated to reflux for a period of 3 hours. Then the mixture was cooled, poured into ice water and extracted with methylene chloride.

The organic phase was washed with water until the wash waters were neutral, then the wash waters were extracted with methylene chloride and the extracts were washed with water.

The organic phases were combined, dried and evaporated to dryness under vacuum at a temperature of 50° C. A resin was obtained which was subjected to chromatography through magnesium silicate. The column was eluted with methylene chloride containing 2.5% of acetone, and 511 mg of product were obtained.

The product was triturated in 4 cc. of isopropyl ether, heated to reflux, iced, vacuum filtered and dried under vacuum. 371 mg. of 19-nor-Δ$^{4,9,11}$-pregnatriene-20ξ-ol-3-one, XVI, were obtained, having a melting point of 184° C.

The product occurred in form of prismatic needles, insoluble in water, dilute aqueous acids and alkalis, and soluble in alcohols, ether, acetone, benzene and chloroform.

The compound is not described in the literature.

Step O: 19-nor-Δ$^{4,9,11}$-pregnatriene-3,20-dione, I 300 mg. of 19-nor-Δ$^{4,9,11}$-pregnatriene-20ξ-ol-3-one, XVI, were dissolved in 33 cc. of anhydrous acetone while agitating under a nitrogen atmosphere.

The solution was cooled to +2° C., then 150 mg. of diatomaceous earth were added. Next, 0.9 cc. of a sulfochromic acid solution were introduced into same over a period of a half hour, said solution being prepared from:

| | | |
|---|---|---|
| Chromic acid anhydride | mg | 103 |
| 66° Bé. concentrated sulfuric acid | cc | 0.1 |
| Water | cc | 1 |

The solution was agitated for 1½ hours at a temperature of about 0° C., then poured into 150 cc. of water containing 10 cc. of a saturated aqueous solution of sodium bicarbonate.

The mixture was extracted with methylene chloride. The organic phase was filtered, then washed with water until it was neutral. The wash waters were again extracted with methylene chloride and washed with water until neutral.

The organic phases were combined, dried, filtered and brought to dryness under vacuum. 280 mg. of product were obtained.

The product obtained was subjected to chromatography through magnesium silicate, eluted with methylene chloride first containing 2%, then 2.5% of acetone, and 126 mg. of product were obtained.

The product was dissolved in hot isopropyl ether, iced overnight, vacuum filtered and dried. 97 mg. of 19-nor-Δ$^{4,9,11}$-pregnatriene-3,20-dione, I, were obtained, having a melting point of 94° C.

The purification of this product by chromatography with elution with methylene chloride containing 1.5% acetone gave a sample having a melting point of 98° C., and a specific rotation $[\alpha]_D^{20}$=+84.3° (c.=0.5% in methanol). This product occurred in the form of prismatic needles, insoluble in water, dilute aqueous acids and alkalis, and soluble in alcohols, ether, acetone, benzene and chloroform.

*Analysis.*—C$_{20}$H$_{24}$O$_2$, molecular weight=296.39. Calculated: C, 81.04%; H, 8.16%. Found: C, 81.2%; H, 8.4%.

This compound is not described in the literature.

The preceding specific embodiment illustrates the principles of the invention. It is to be understood however that other expedients known to those skilled in the art may be employed without departing from the spirt of the invention or the scope of the appended claims.

We claim:

1. 19-nor-Δ$^{4,9,11}$-pregnatriene-3,20-dione of the formula

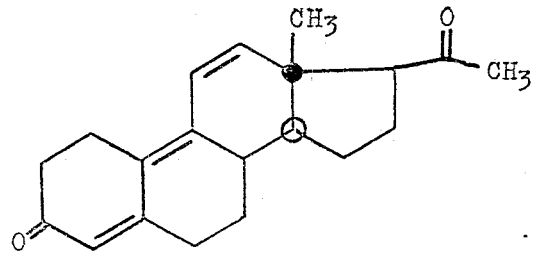

2. 5-methoxy-17α-cyano-des-A-Δ$^{5,7,9}$-estratriene-17β-ol.

3. 5-methoxy-17-cyano-des-A-Δ$^{5,7,9,16}$-estratetraene.

4. 5-methoxy-19-nor-des-A-Δ$^{5,7,9,16}$-pregnatetraene-20-one.

5. 5-methoxy-19-nor-des-A-Δ$^{5,7,9}$-pregnatriene-20-one.

6. 5-methoxy-19-nor-des-A-Δ$^{5,7,9}$-pregnatriene-20ξ-ol.

7. The 5-enamino compound of the formula

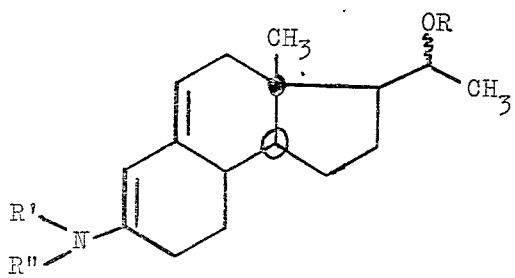

wherein R represents the acyl radical of a hydrocarbon carboxylic acid having from 1 to 8 carbon atoms, and R' and R'' are selected from the group consisting of lower alkyl and when taken together represent a bridging radical selected from the group consisting of alkylene having from 4 to 6 carbon atoms and morpholino.

8. 3 - chloro - 20ξ - acyloxy - 4,5 - seco - 19 - nor-$\Delta^{2,9}$-pregnadiene-5-one wherein acyl represents the acyl radical of a hydrocarbon carboxylic acid having from 1 to 8 carbon atoms.

9. 3 - chloro - 5,20ξ - diacyloxy - 4,5 - seco - 19 - nor-$\Delta^{2,5(10),9(11)}$-pregnatriene wherein acyl represents the acyl radical of a hydrocarbon carboxylic acid having from 1 to 8 carbon atoms.

10. 3 - chloro-20ξ - acyloxy - 4,5 - seco - 19 - nor-$\Delta^{2,9,11}$-pregnatriene-5-one wherein acyl represents the acyl radical of a hydrocarbon carboxylic acid having from 1 to 8 carbon atoms.

11. 20ξ - acyloxy - 4,5 - seco - 19 - nor - $\Delta^{9,11}$ - pregnadiene-3,5-dione wherein acyl represents the acyl radical of a hydrocarbon carboxylic acid having from 1 to 8 carbon atoms.

12. A process for the production of 19-nor-$\Delta^{4,9,11}$-pregnatriene-3,20-dione of the formula

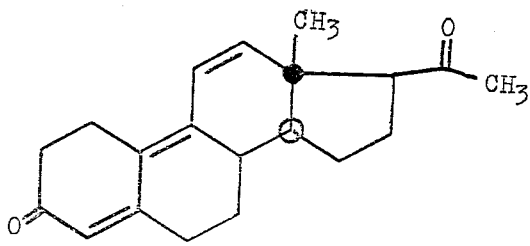

which comprises the steps of (a) condensing an alkali metal cyanide with 5-methoxy-des-A-$\Delta^{5,7,9}$-estratriene-17-one, (b) reacting the resultant 5-methoxy-17α-cyano-des-A-$\Delta^{5,7,9}$-estratriene-17β-ol with a phosphorus oxychloride dehydrating agent, (c) reacting the resultant 5-methoxy-17-cyano-des-A-$\Delta^{5,7,9,16}$-estratraene with a methylmagnesium halide in an organic solvent, (d) hydrolyzing the product by the action of an acetic acid hydrolyzing agent, (e) reducing the resultant 5-methoxy-19-nor-des-A-$\Delta^{5,7,9,16}$-pregnatetraene-20-one by the action of hydrogen in the presence of a catalyst, (f) reducing the resultant 5 - methoxy - 19 - nor - des - A - $\Delta^{5,7,9}$-pregnatriene - 20-one by the action of an alkali metal borohydride in a solvent, (g) reducing the resultant 5-methoxy-19-nor-des-$\Delta^{5,7,9}$-pregnatriene-20ξ-ol by the Birch process, (h) hydrolyzing the product by the action of a strong mineral acid hydrolyzing agent, (i) esterifying the resultant 19-nor-des-A-$\Delta^{9}$-pregnene-20ξ-ol-5-one by the action of an esterifying derivative of a a hydrocarbon carboxylic acid having from 1 to 8 carbon atoms. (j) reacting the resultant ester of the formula

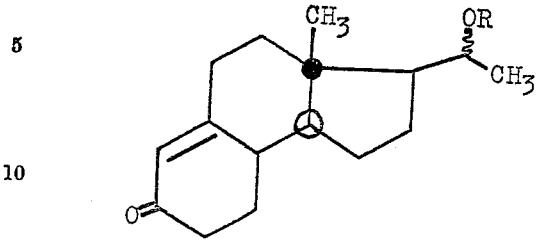

wherein R represents the acyl radical of a hydrocarbon carboxylic acid having from 1 to 8 carbon atoms, with a secondary amine of the formula

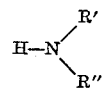

wherein R' and R'' are selected from the group consisting of lower alkyl and when taken together represent a bridging radical selected from the group consisting of alkylene having from 4 to 6 carbon atoms and morpholino, (k) condensing the resultant 5-enamino compound of the formula

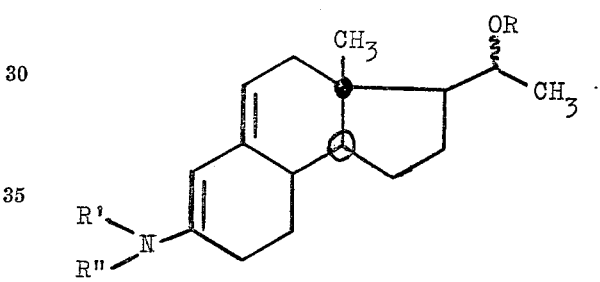

wherein R, R' and R'' have the above-assigned values with a 1-halo-3-chloro-2-butene in the presence of an organic solvent, (l) enolyzing the resultant 4,5 seco compound of the formula

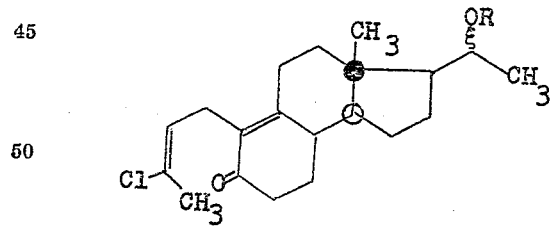

wherein R has the above-assigned value by the action of an esterifying derivative of a hydrocarbon carboxylic acid having from 1 to 8 carbon atoms in the presence of an organic solvent, (m) subjecting the resultant 5-acyloxy compound of the formula

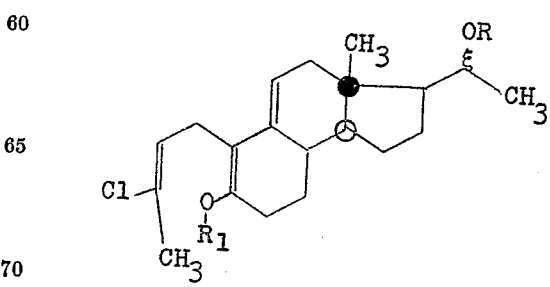

wherein R has the above-assigned value and $R_1$ represents the acyl radical of a hydrocarbon carboxylic acid having from 1 to 8 carbon atoms to the action of bromine followed by dehydrobromination and weak alkanoic acid hydrolysis, (n) hydrolyzing the resultant 5-one of the formula

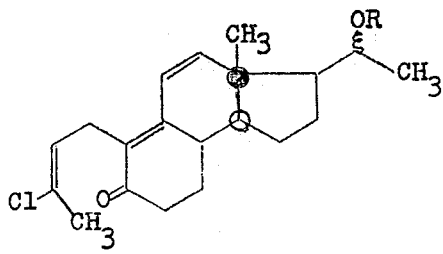

wherein R has the above-assigned value by the action of a strong mineral acid hydrolyzing agent, (O) cyclizing the resultant dione of the formula

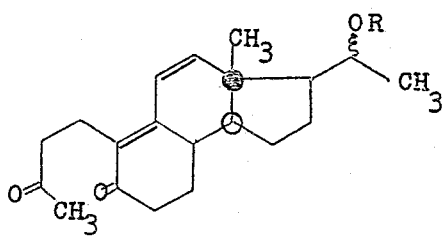

wherein R has the above-assigned value by the action of an alkali metal alkanolate cyclizing agent, (p) saponifying the resultant triene compound of the formula

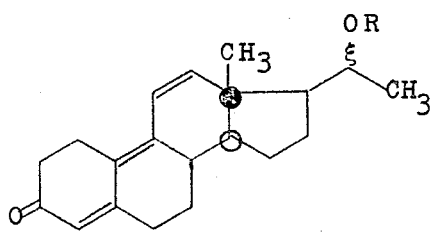

wherein R has the above-assigned value by the action of an alkaline saponification agent, (q) oxidizing the resultant 19-nor-$\Delta^{4,9,11}$-pregnatriene-20ξ-ol-3-one by the action of a sulfochromic acid oxidant and (r) recovering said 19-nor-$\Delta^{4,9,11}$-pregnatriene-3,20-dione.

13. The process of claim 12, step (a) wherein said alkali metal cyanide is potassium cyanide in the presence of acetic acid and the reaction is conducted in the cold at temperatures of from about 0° C. to room temperature.

14. The process of claim 12, step (c), wherein said methylmagnesium halide in an organic solvent is methylmagnesium bromide in ether.

15. The process of claim 12, step (e), wherein said catalyst is a palladium hydrogenation catalyst.

16. The process of claim 12, step (k), wherein said 1-halo-3-chloro-2-butene in the presence of an organic solvent is 1,3-dichloro-2-butene in the presence of potassium iodide and dimethylformamide.

17. The process of claim 12, step (m), wherein said dehydrobrination and weak alkanoic acid hydrolysis is effected by the action of mixed lithium carbonate-lithium bromide in dimethylformamide and acetic acid.

18. A therapeutic composition comprising a minor amount of 19-nor-$\Delta^{4,9,11}$-pregnatriene-3,20-dione of the formula

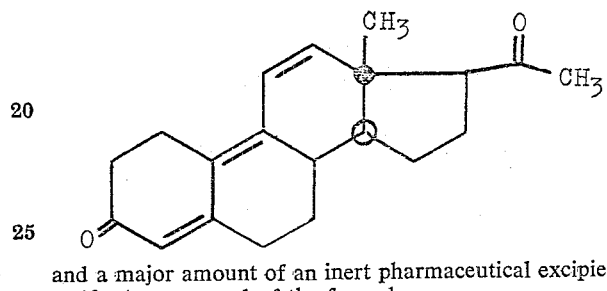

and a major amount of an inert pharmaceutical excipient.

19. A compound of the formula

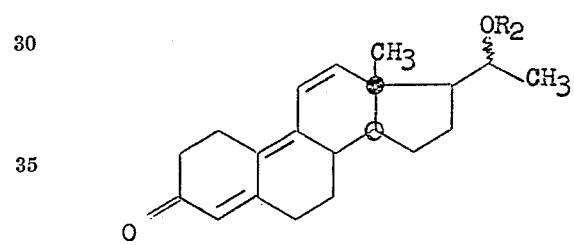

wherein $R_2$ is selected from the group consisting of hydrogen and an acyl radical of a hydrocarbon carboxylic acid having from 1 to 8 carbon atoms.

References Cited by the Examiner

Bacourt et al.: Bull. Soc. Chim., France, pages 1923–25 (1963).

LEWIS GOTTS, *Primary Examiner.*

HENRY A. FRENCH, *Assistant Examiner.*